US008939714B1

(12) United States Patent
McCune et al.

(10) Patent No.: US 8,939,714 B1
(45) Date of Patent: Jan. 27, 2015

(54) METHOD OF ASSEMBLY FOR GAS TURBINE FAN DRIVE GEAR SYSTEM

(71) Applicant: United Technologies Corporation, Hartford, CT (US)

(72) Inventors: Michael E. McCune, Colchester, CT (US); William G. Sheridan, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 14/159,559

(22) Filed: Jan. 21, 2014

Related U.S. Application Data

(62) Division of application No. 13/975,635, filed on Aug. 26, 2013, now Pat. No. 8,763,251.

(51) Int. Cl.
F01D 15/12 (2006.01)
F02C 7/36 (2006.01)
F16H 1/28 (2006.01)
F16H 57/023 (2012.01)

(52) U.S. Cl.
CPC .. *F02C 7/36* (2013.01); *F16H 1/28* (2013.01); *F16H 57/023* (2013.01)
USPC .................................. 415/122.1; 416/170 R

(58) Field of Classification Search
CPC ....... F16H 1/28; F16H 57/082; F16H 57/023; F02C 3/107; F02C 7/36; F05D 2260/40311; F05D 2230/60
USPC ........... 415/122.1, 124.1; 416/170 R; 475/82, 475/109
See application file for complete search history.

(56) References Cited

U.S. PATENT DOCUMENTS

| 2,591,743 | A | 4/1952 | Thompson |
| 3,650,353 | A | 3/1972 | Abbott |
| 3,853,432 | A | 12/1974 | Cronstedt |
| 4,271,928 | A | 6/1981 | Northern |
| 4,378,711 | A | 4/1983 | Daniel |
| 4,827,712 | A | 5/1989 | Coplin |

(Continued)

FOREIGN PATENT DOCUMENTS

| DE | 3410977 A1 | 9/1985 |
| JP | 6-1889 | 1/1994 |

(Continued)

OTHER PUBLICATIONS

Extended European Search Report or appl. No. EP 07 25 2647 dated Jan. 25, 2011.

(Continued)

*Primary Examiner* — Edward Look
*Assistant Examiner* — Juan G Flores
(74) *Attorney, Agent, or Firm* — Carlson, Gaskey & Olds, PC

(57) ABSTRACT

A method of mounting a gear train to a torque frame includes providing a unitary carrier having a central axis that includes spaced apart walls and circumferentially spaced connecting structure defining mounts for interconnecting the walls. Spaced apart apertures are provided between the mounts at an outer circumference of the carrier. Gear pockets are provided between the walls and mounts extending to the apertures, and a central opening in at least one of the walls. A plurality of intermediate gears and a sun gear are inserted in the carrier. A first ring gear half is placed about the outer periphery of the intermediate gears, and attach a torque frame to the carrier.

26 Claims, 9 Drawing Sheets

(56) References Cited

U.S. PATENT DOCUMENTS

| | | | |
|---|---|---|---|
| 4,914,904 | A | 4/1990 | Parnes et al. |
| 5,391,125 | A * | 2/1995 | Turra et al. .................... 475/346 |
| 5,433,674 | A | 7/1995 | Sheridan et al. |
| 5,466,198 | A * | 11/1995 | McKibbin et al. ............ 475/346 |
| 5,472,383 | A | 12/1995 | McKibbin |
| 6,158,210 | A | 12/2000 | Orlando |
| 6,223,616 | B1 | 5/2001 | Sheridan |
| 7,011,599 | B2 | 3/2006 | Becquerelle et al. |
| 7,033,301 | B2 | 4/2006 | Kimes |
| 7,104,918 | B2 | 9/2006 | Mitrovic |
| 7,112,157 | B2 | 9/2006 | Uebbing |
| 7,214,160 | B2 | 5/2007 | Illerhaus |
| 7,490,460 | B2 | 2/2009 | Moniz et al. |
| 8,172,717 | B2 * | 5/2012 | Lopez et al. ................... 475/346 |
| 8,202,772 | B2 | 6/2012 | Sheridan |
| 8,667,688 | B2 | 3/2014 | McCune et al. |
| 8,763,251 | B2 | 7/2014 | McCune et al. |
| 2004/0259679 | A1 * | 12/2004 | Becquerelle et al. ......... 475/331 |
| 2009/0111639 | A1 | 4/2009 | Klingels |
| 2010/0035719 | A1 * | 2/2010 | Wang ............................. 475/331 |
| 2010/0261571 | A1 | 10/2010 | Matsuoka et al. |
| 2014/0045645 | A1 | 2/2014 | McCune et al. |

FOREIGN PATENT DOCUMENTS

| | | |
|---|---|---|
| JP | 2001-208146 | 8/2001 |
| JP | 2005-163666 | 6/2005 |
| JP | 2005-207472 | 8/2005 |
| WO | 2012098108 A1 | 7/2012 |

OTHER PUBLICATIONS

International Search Report and Written Opinion for International Application No. PCT/US2013/062220 mailed on Aug. 15, 2014.

* cited by examiner

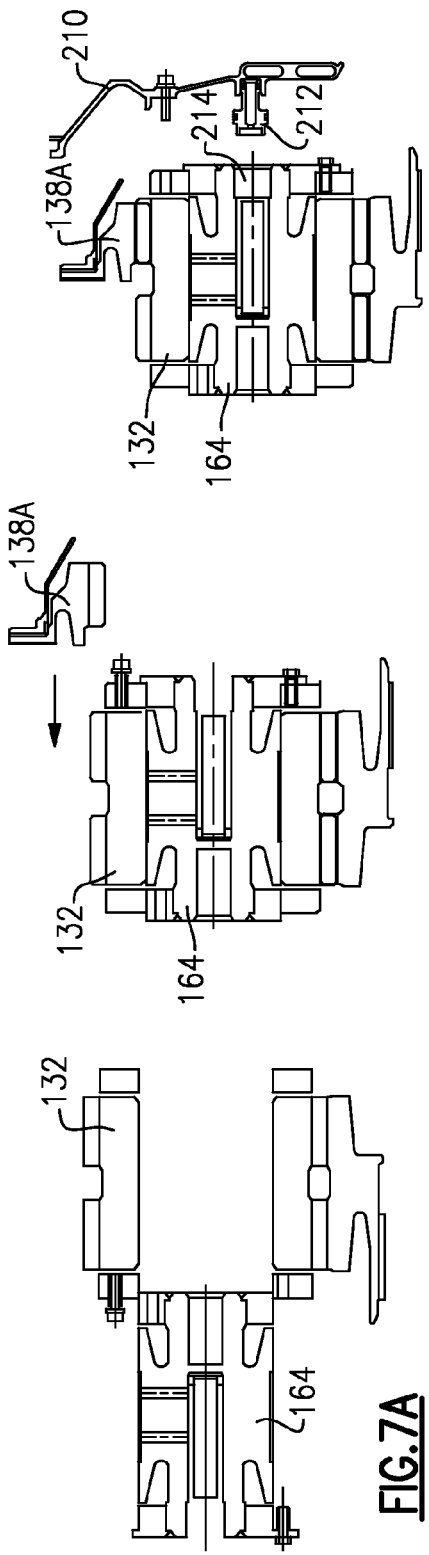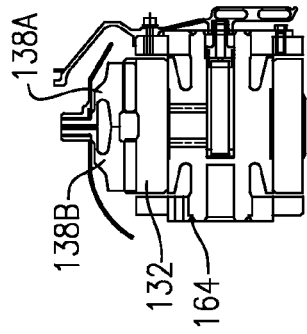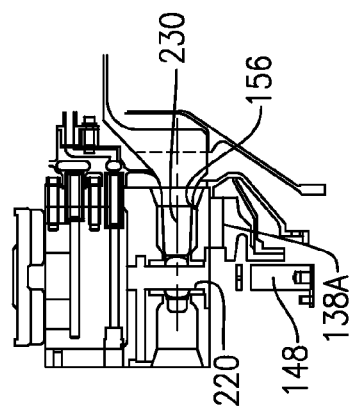

METHOD OF ASSEMBLY FOR GAS TURBINE FAN DRIVE GEAR SYSTEM

METHOD OF ASSEMBLY FOR GAS TURBINE FAN DRIVE GEAR SYSTEM

This application is a divisional of U.S. application Ser. No. 13/975,635, filed Aug. 26, 2013, which is a divisional of U.S. patent application Ser. No. 13/629,834, filed Sep. 28, 2012, which is a continuation-in-part of U.S. patent application Ser. No. 12/718,436, filed Mar. 5, 2010, now U.S. Pat. No. 8,276,275, which is a divisional application of U.S. patent application Ser. No. 11/481,112, filed on Jul. 5, 2006, now U.S. Pat. No. 7,704,178.

BACKGROUND OF THE INVENTION

This invention relates to assembling an epicyclic gear train employed to drive a turbo fan.

Gas turbine engines may employ an epicyclic gear train connected to a turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan. In arrangements in which the ring gear is fixed against rotation, the intermediate gears are referred to as "planetary" gears and the carrier is coupled to the output shaft that supports the turbo fan.

The housings are typically split along a central plane, and the gear train can be assembled, with the carrier housing halves then being brought together and secured. For improved strength and rigidity, as compared with a two-part housing, it is desirable for an epicyclic gear train to have a unitary carrier housing.

SUMMARY OF THE INVENTION

In a featured embodiment, a gear reduction for use in a gas turbine engine has a unitary carrier centered on an axis and has a pair of axially spaced apart side walls, and axially extending circumferentially spaced connecting structure, defining spaced side walls, a central opening, and circumferentially spaced smaller openings spaced radially outwardly of the central opening. Internal surfaces define circumferentially spaced curved walls to define intermediate gear pockets. The intermediate gear pockets extend away from the central enlarged opening for a distance greater than a diameter of intermediate gears received in the intermediate gear pockets. Intermediate gears are received in the intermediate gear pockets, and secured at a position spaced radially inwardly of a radially outermost area in the intermediate gear pockets. The intermediate gears have teeth engaged with teeth of a sun gear received in the central opening. A ring gear is received at radially outer locations such that ring gear teeth engage teeth of the intermediate gears.

In another embodiment according to the previous embodiment, the intermediate gears and sun gear are formed of single gear bodies. The ring gear is formed of two separate ring gear halves. The intermediate gears are secured by bushings. Journal bearings are inserted within each of the intermediate gears.

In another embodiment according to any of the previous embodiments, a torque frame has a plurality of axially extending fingers received within slots in the carrier at locations circumferentially intermediate of locations of the intermediate gears, and pins inwardly of radially inwardly extending apertures in a radially outer surface of the carrier. The pins lock the fingers within the slot. The ring gear is received radially outwardly of the radially inwardly extending apertures.

In another embodiment according to any of the previous embodiments, the sun gear and intermediate gears have two spaced portions, with each of the portions having helical gear teeth. The helical gear teeth are on the two portions extending in opposed directions. The two ring gear halves each have one direction of helical gear teeth, with the helical gear teeth on the two halves ring gear extending in opposed directions.

In another embodiment according to any of the previous embodiments, the sun gear and intermediate gears have two spaced portions, with each of the portions having helical gear teeth. The helical gear teeth on the two portions extend in opposed directions. The two ring gear halves each have one direction of helical gear teeth, with the helical gear teeth on the two halves ring gear extending in opposed directions.

In another embodiment according to any of the previous embodiments, a torque frame has a plurality of axially extending fingers received within slots in the carrier, at locations circumferentially intermediate of locations of the intermediate gears, and pins inwardly of radially inwardly extending apertures in a radially outer surface of the carrier. The pins lock the fingers within the slot. The ring gear is received radially outwardly of the radially inwardly extending apertures.

These and other features of the present invention can be best understood from the following specification and drawings, the following of which is a brief description.

BRIEF DESCRIPTION OF THE DRAWINGS

FIG. 7A shows an assembly step.

FIG. 7B shows a subsequent assembly step.

FIG. 7C shown another subsequent step.

FIG. 7E shows a subsequent step.

FIG. 7F shows you another subsequent step.

DETAILED DESCRIPTION

Figure 1:
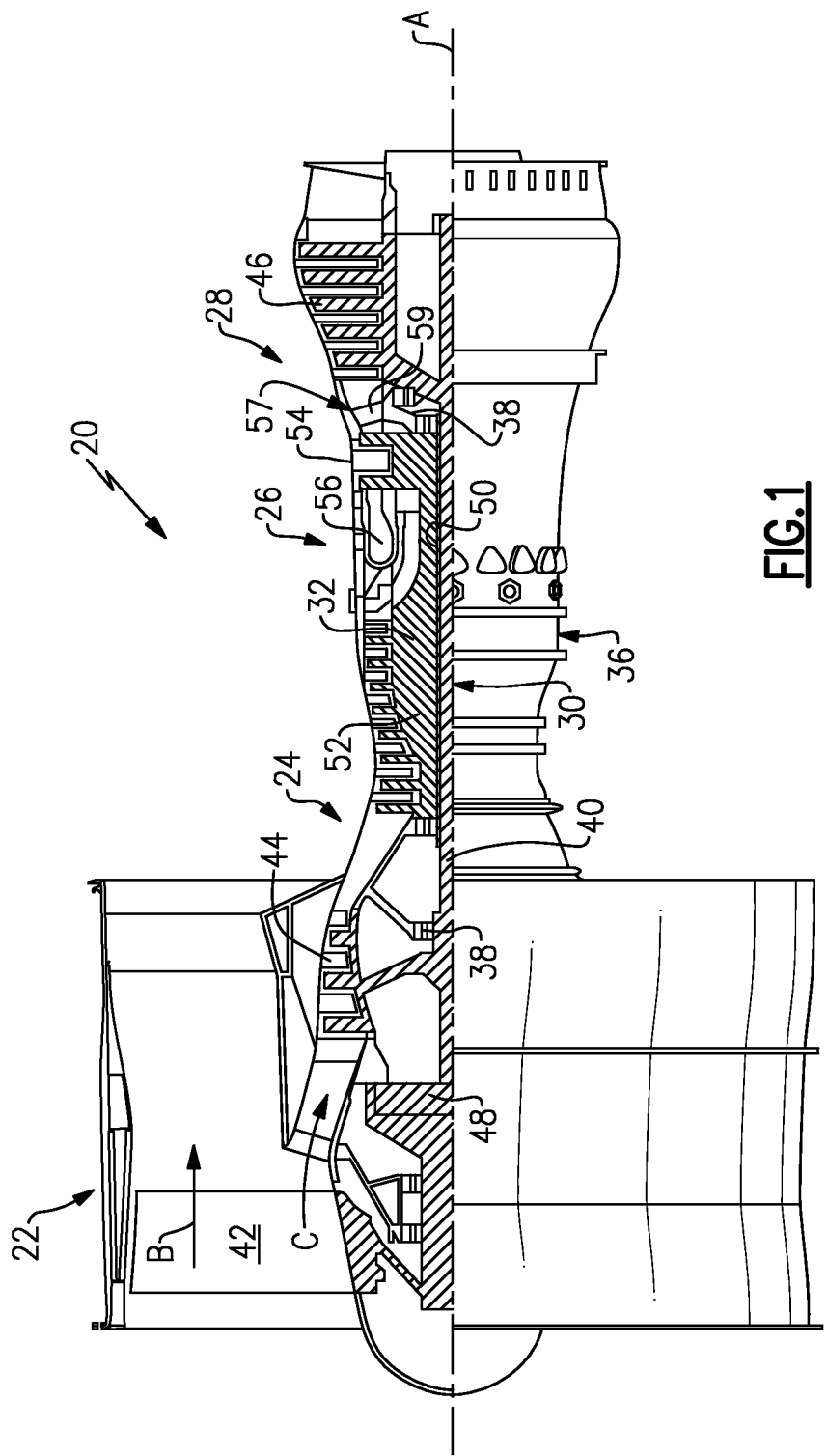
FIG. 1 is a partial cross-sectional view of a front portion of a gas turbine engine illustrating a turbo fan, epicyclic gear train and a compressor section.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
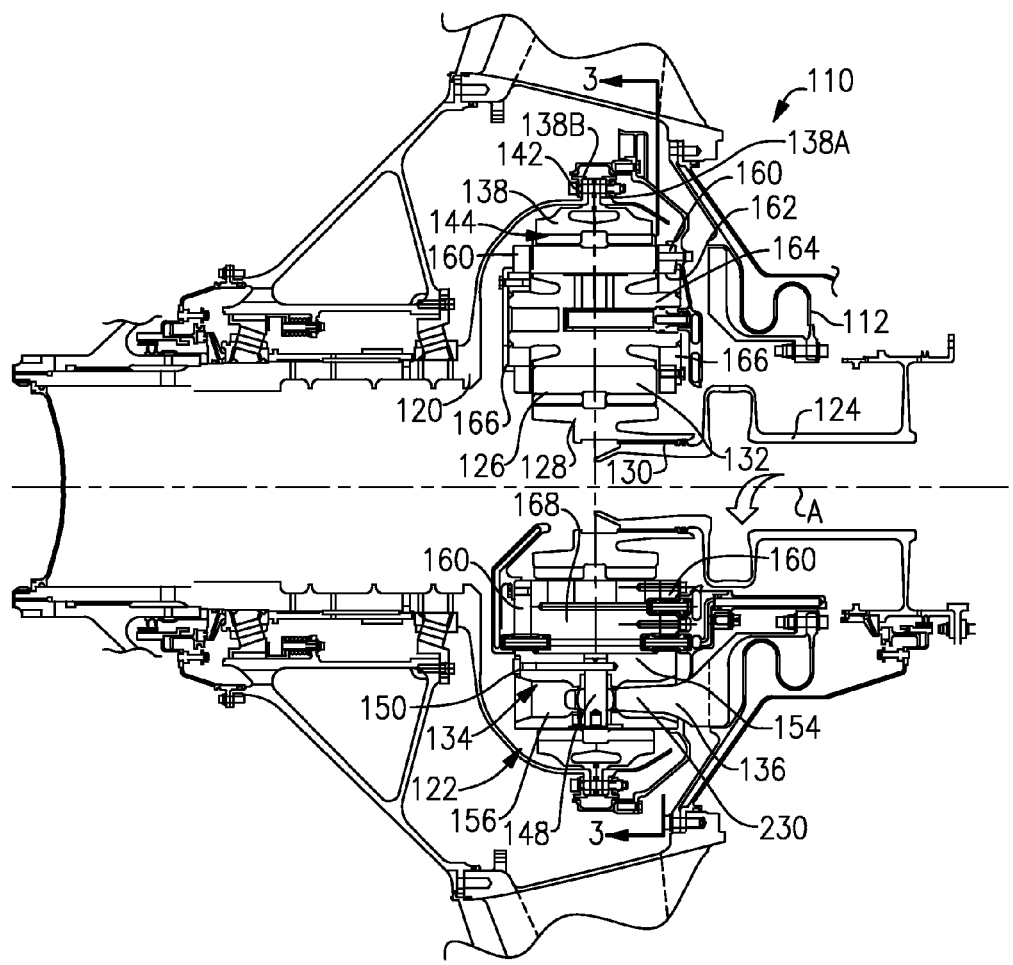
FIG. 2 is a cross-sectional view of the epicyclic gear train shown in FIG. 1.

The geared architecture 48 may be assembled as described below for gear train 122. In the example arrangement shown, the epicyclic gear train 122 is a star gear train. Of course, the claimed invention also applies to other epicyclic gear trains such as a planetary arrangement. Referring to FIG. 2, the epicyclic gear train 122 includes a sun gear 128 that is connected to the compressor shaft 124, which provides rotational input, by a splined connection 130. A carrier 134 is fixed to the housing 112 by a torque frame 136. The carrier 134 supports intermediate gears (which are star gears 132 in the arrangement shown) that are coupled to the sun gear 128 by meshed interfaces 126 between the teeth of the sun and star gears 128, 132. A ring gear 138A/B surrounds the carrier 134 and is coupled to the star gears 132 by meshed interfaces 144. The ring gear 138A/B, which provides rotational output, is secured to the turbo fan shaft 120 by connection 142. Ring gear 138 is actually formed by two ring gear halves 138A and 138B.

Figure 5:
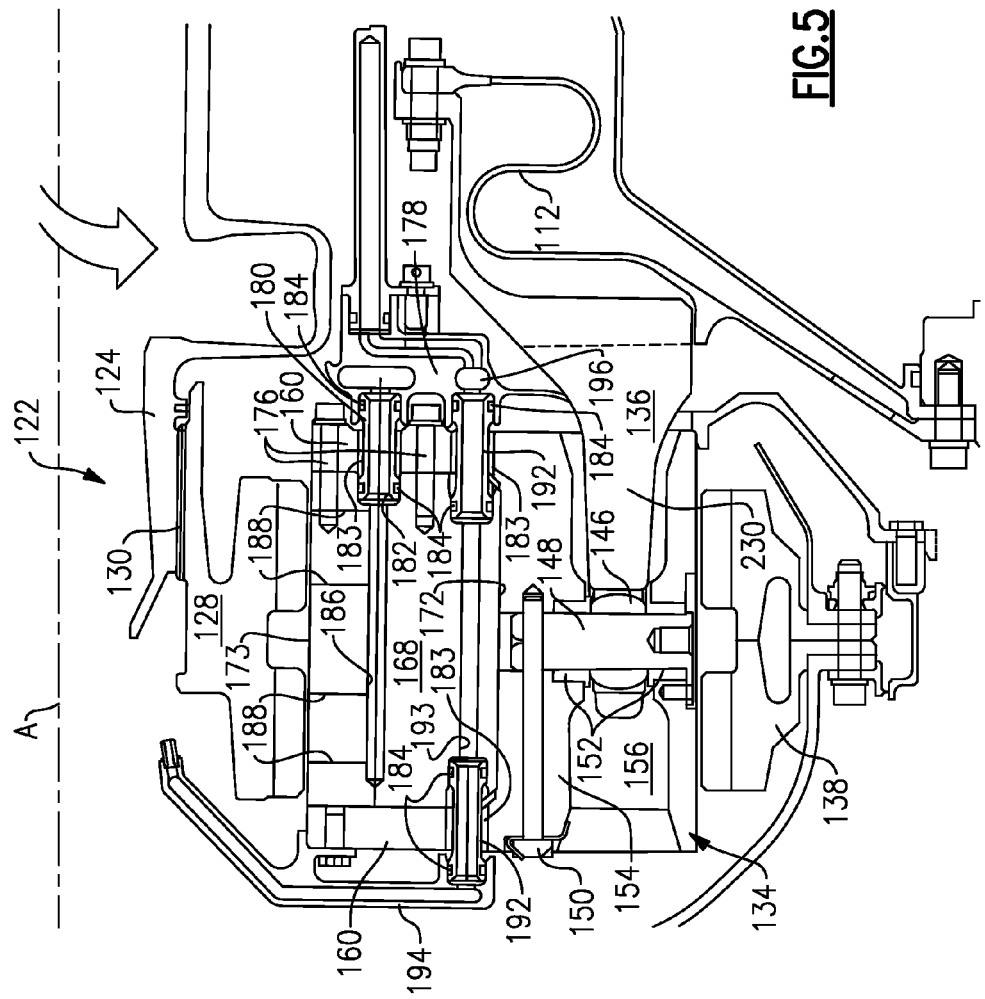
FIG. 5 is an enlarged view of a portion of the epicyclic gear train shown in FIG. 2.

In one example, the torque frame 136 grounds the carrier 134 to the housing 112. For example, mounts 154 have apertures 156 receiving fingers 230 of the torque frame 136, as shown in FIGS. 2 and 5. Pins 148 extend through spherical bearings 146 and bushings 152 secure the fingers 230 to the carrier 134. Fasteners 150 retain the pins 148 to the carrier 134.

Figure 3A:
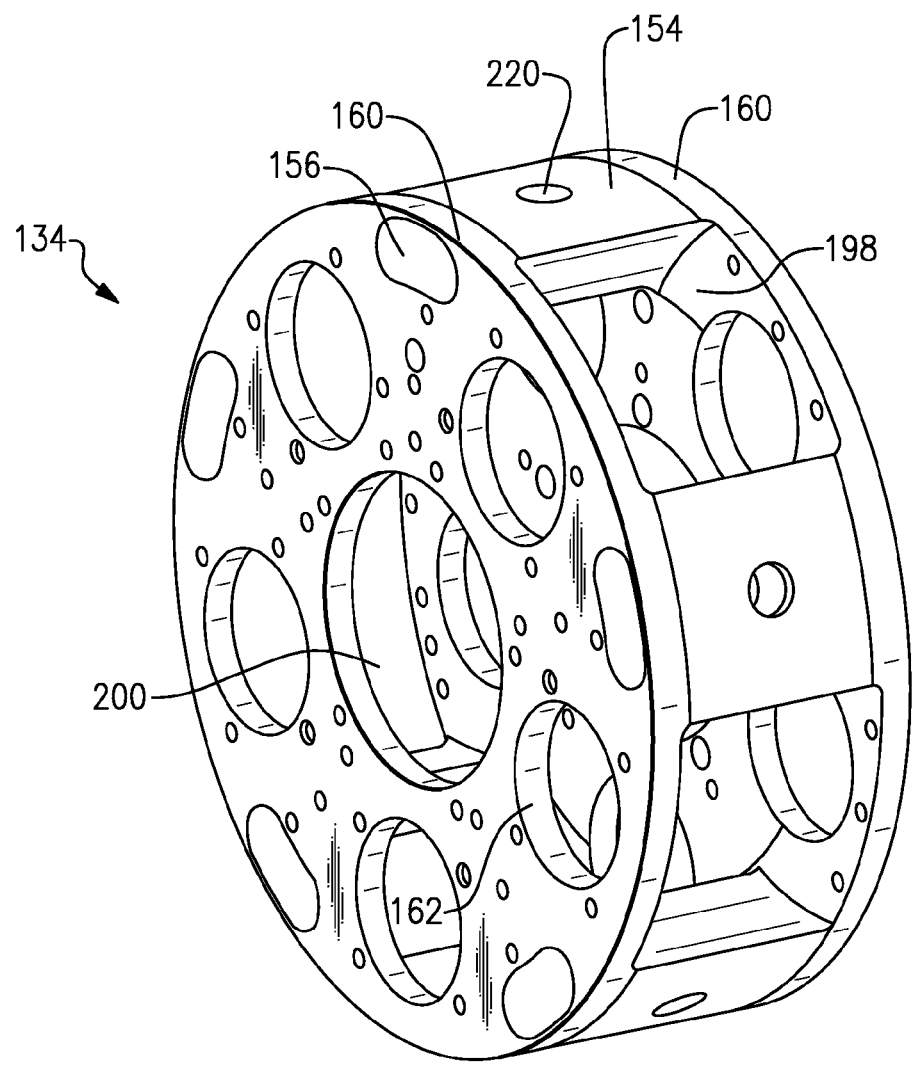
FIG. 3A shows a unitary carrier.
Figure 3B:
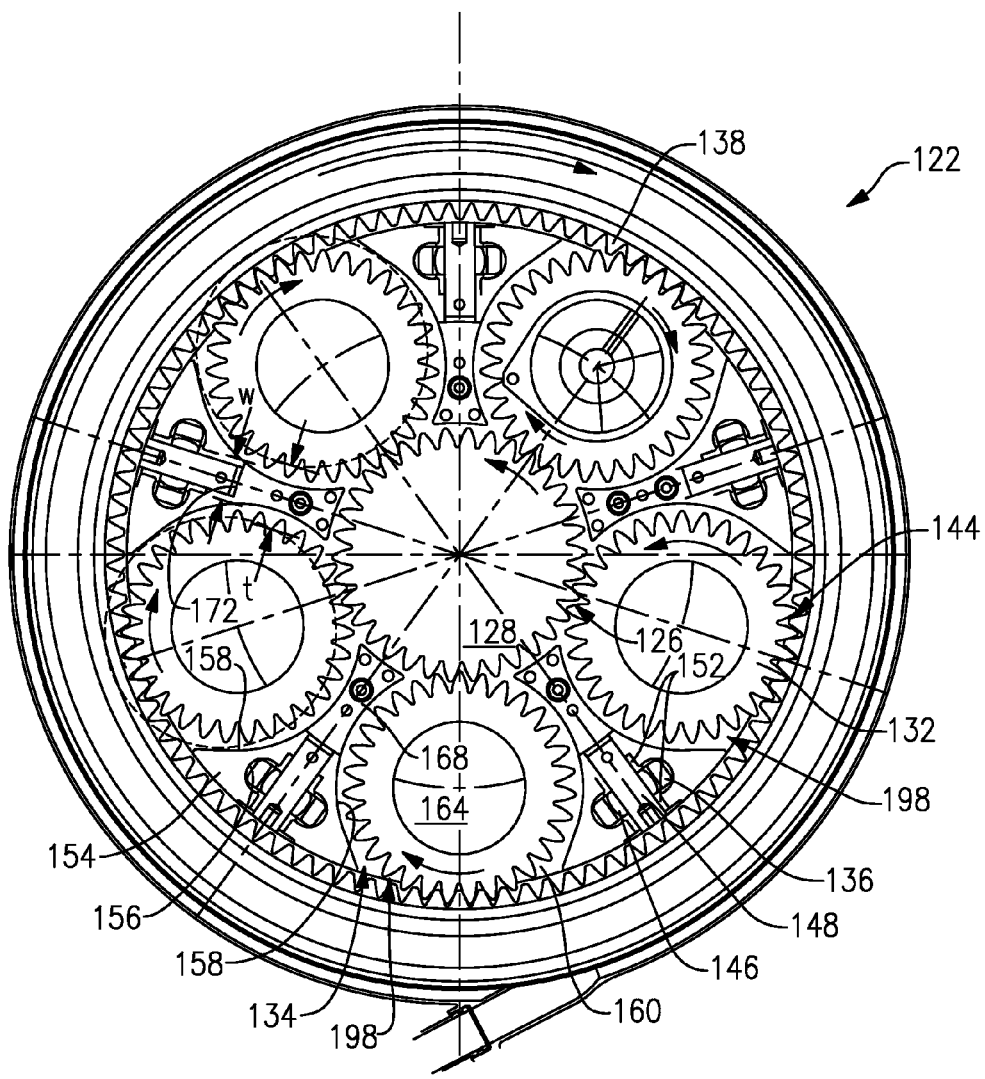
FIG. 3B is an end view of the epicyclic gear train taken along line 3-3 in FIG. 2 with star gears shown in an installation position.

The carrier 134 is a unitary structure manufactured from one piece for improved structural strength and rigidity, as compared with two-part housings, as shown in FIG. 3A. Carrier 134 is centered on an axis A (see FIG. 4). The carrier 134 includes axially spaced apart side walls 160 that are interconnected by the circumferentially spaced structure defining mounts 154, which are generally wedge-shaped members, as best shown in FIG. 3B. The mounts 154 and side walls 160 are unitary with one another. That is, these components are fixed, such as by being welded or cast as a unitary structure, before the gear train is assembled. The mounts 154 have opposing curved surfaces (see FIG. 3B) 158 that are in close proximity to the star gears 132 and generally follow the curvature of the teeth of the star gears 132 so that any oil on the curved surfaces 158 will likely find its way to the star gears 132 for additional lubrication.

The mounts 154 are circumferentially spaced about the carrier 134 to provide apertures 198 through which the star gears 132 extend to engage the ring gear 138. The side walls 160 include holes 162 for receiving a journal bearing 164 (see FIG. 2) that supports each of the star gears 132. Each journal bearing 164 is retained within the carrier 134 by retainers 166 fastened to the side walls 160.

Figure 4:
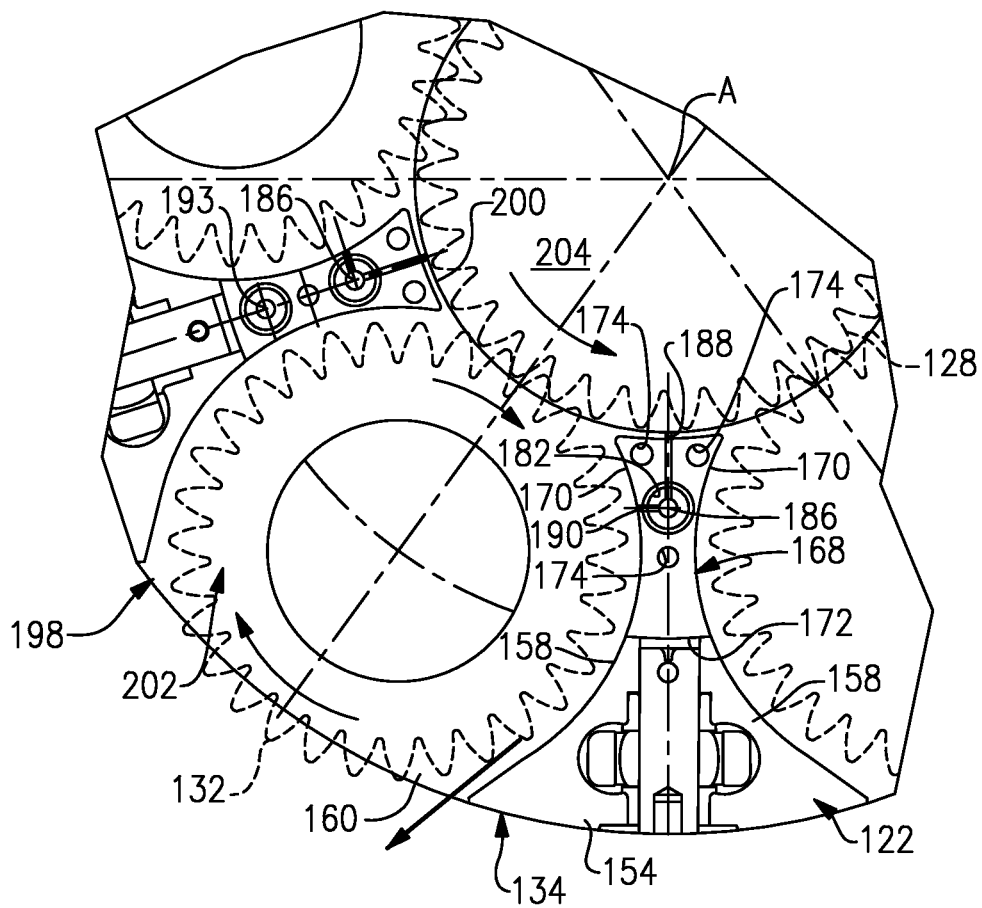
FIG. 4 is an enlarged view of a portion of the epicyclic gear train shown in FIG. 3 with a sun gear and star gears shown in phantom.

Oil baffles 168 are arranged between the side walls 160 near each of the mounts 154, best shown in FIG. 2. Referring to FIGS. 4 and 5, the baffles 168 include ends 172 that abut the mounts 154, in the example shown. The baffles 168 also include opposing curved surfaces 170 arranged in close proximity to the star gears 128. The curved surfaces 158, 170 are contiguous with and adjoin one another, in the example shown, and provide gear pockets 202 that receive the star gears 132. A gear pocket 204, which receives the sun gear 128, is also provided between a surface 173 on each of the baffles 168 opposite the ends 172.

As shown in FIG. 4, one of the side walls 160 includes holes 174 that receive fasteners 176 which secure each of the baffles 168 to the carrier 134. The baffles 168 include a lubrication passage provided by a primary passage 186 that fluidly communicates with a lubricant distributor 178. The lubricant distributor 178 is fed oil from a lubricant supply 196. In one example, the baffles 168 include openings 182 that receive a tube 180 extending through a hole 183 in the side wall 160. Seals 184 seal the tube 180 to the opening 182 and lubricant distributor 178. Other tubes 192 having seals 184 are used to provide oil to an external spray bar 194 through another lubrication passage (spray bar passage 193 that extends through one of the baffles 168). The external spray bar 194 is secured to the carrier 134 and sprays oil in the vicinity of the sun gear 128 near the splined connection 130 (shown in FIGS. 2 and 5).

The primary passage 186 is in communication with first and second passages 188, 190 that spray oil on the teeth of the sun and star gears 128, 132. In the example shown, the first and second passages 188, 190 are arranged ninety degrees from one another.

With the example baffles 168, lubricant distribution is integrated into the baffle so that separate components are eliminated. The baffles 168 can be constructed from a different, lighter weight material than the carrier 134.

The example carrier 134 is constructed from one piece, which improves the structural integrity of the carrier. A central opening 200 is machined in at least one of the side walls 160 and provides the gear pocket 204, see FIG. 4. Gear pockets 202 are machined between the side walls 160 and mounts 154 for each of the star gears 132 and form apertures 198 at an outer circumference of the carrier 134.

Figure 8:
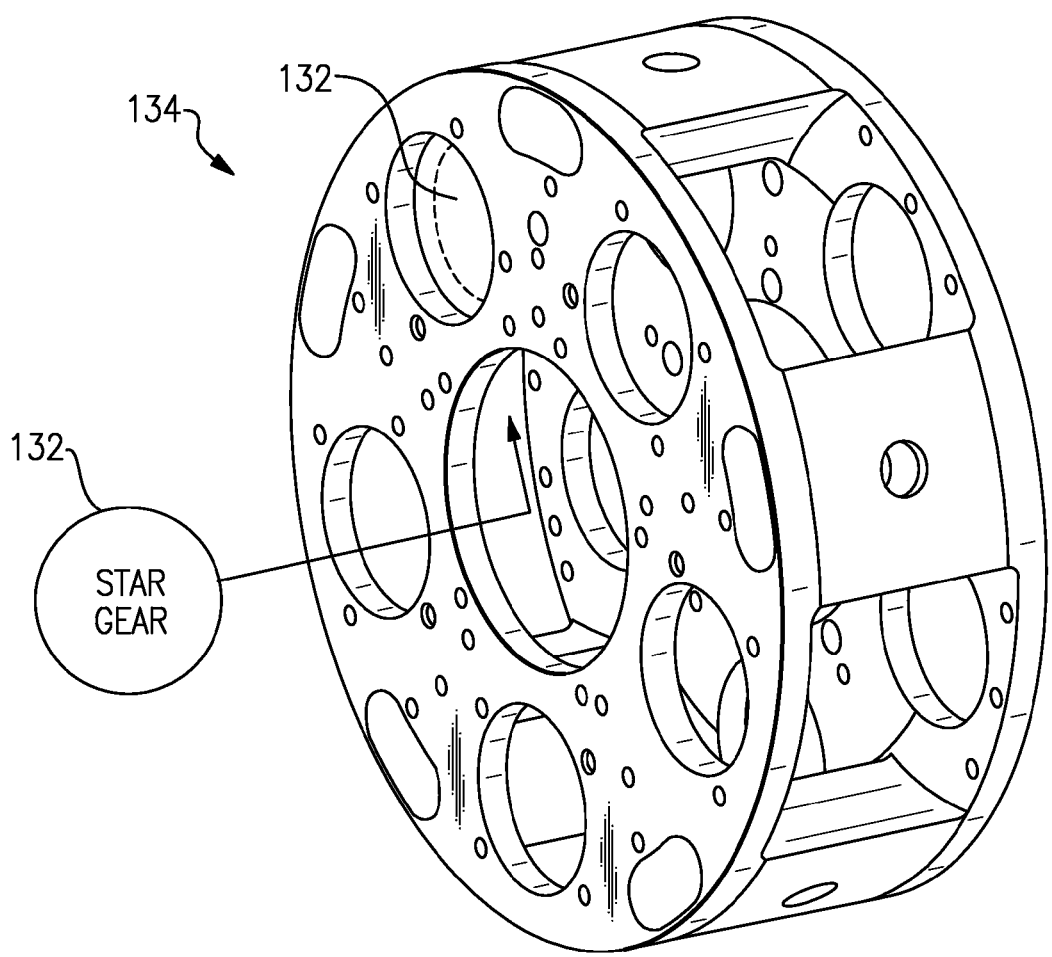
FIG. 8 schematically illustrates a star gear being inserted into the carrier.

Returning to FIG. 3B, the star gears 132 are inserted into the central opening 200 and moved radially outwardly so that they extend through the apertures 198 and are preferably in abutment with the mounts 154 (position indicated by dashed lines in FIG. 3B). This is schematically illustrated in FIG. 8. In this position, there is an adequate gap, t, between the teeth of adjacent star gears 132 to accommodate a width, w, of the end 172 of the baffles 168. After the baffles 168 have been inserted, sun gear 128 can be inserted into the central opening 200. The star gears 132 can now be moved radially inwardly to mesh with the sun gear 128. The baffles 168 are secured to the carrier 134 using fasteners 176. The tubes 180, 192 can be inserted and the rest of the lubricant distribution system can be connected.

As mentioned above, the star gears 132 are initially inserted within the central hole 200 for the sun gear. The star gears 136 are moved radially outwardly, and the spray bars or baffles 168 are inserted. The sun gear 128 is then inserted, and the star gears 132 may then be moved radially inwardly to engage the sun gear 128. All of this assembly occurs with the carrier already formed as a unitary structure.

Figure 6:
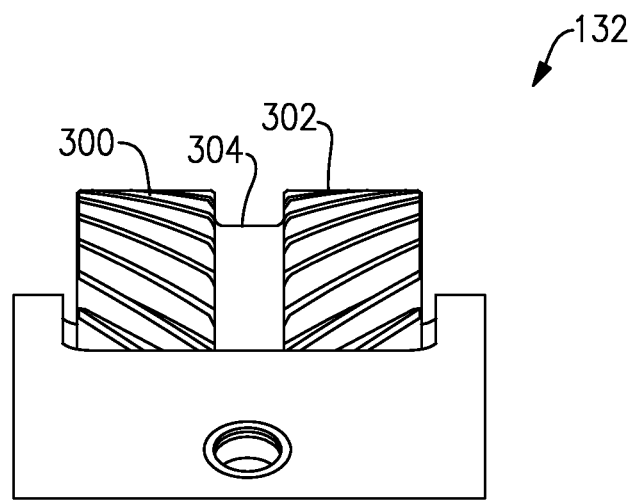
FIG. 6 shows a feature of a gear.

As shown in FIG. 6, the star gears 132 have two toothed portions, 302 and 300, which have helical gear teeth extending in opposed directions. A central area 304 is formed between the toothed portions 302 and 300. Notably, the sun gear looks much the same. The two-part ring gear 138A/B halves each mate with one of the two gear teeth directions.

As shown in FIG. 7A, once the sun gears 128 and star gears 132 are in engagement, the journal bearings 164 may be inserted within the star gears 132. After this, as shown in FIG. 7B, a first half of the ring gear 138A may be moved onto the outer periphery of the star gears 132. A manifold 210 may then be mounted to the gear as shown in FIG. 7C. The manifold 210 has a fluid connection 212 which would be received within a central aperture 214 in the journal bearings 164.

Figure 7D:
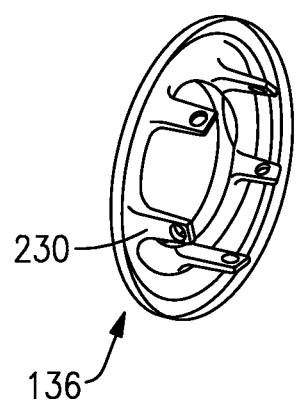
FIG. 7D shows a torque frame.

FIG. 7D shows a detail of a torque frame 136. As shown, fingers 230 extend away from a plane of the torque frame. As mentioned above, the fingers 230 are received within the slots 156 in the unitary carrier 134. The pins 148 may then be moved inwardly through the openings 220 in the mounts 154 to lock the torque frame 156 to the carriers 134.

As can be appreciated in FIG. 7E, the ring gear half 138A has been moved axially such that it does not line up with the apertures 220 in the carrier, which is to receive the pin 148. Once the pin 148 has been moved inwardly to lock the finger 230 within the slot 156, then the ring gear half 138A may be moved back axially over a portion of the aperture 220.

As shown in FIG. 7F, the next step is to mount the other ring gear half 138B, completing the gear drive. At each step, all of the components are secured in some manner. An oil gutter may then be installed.

The arrangement as set forth above thus provides a way to assemble an epicyclic gear train within a unitary carrier housing. Such a gear train, configured and assembled as disclosed herein, has an improved strength and rigidity as compared with such a train having a two-part carrier housing.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gear reduction for use in a gas turbine engine comprising:
   a unitary carrier centered on an axis and having a pair of axially spaced apart side walls, and axially extending circumferentially spaced connecting structure for connecting said pair of spaced side walls, a central opening, and circumferentially spaced smaller openings spaced radially outwardly of said central opening, with internal surfaces of said circumferentially spaced connecting structure to define intermediate gear pockets, with said intermediate gear pockets extending away from said central enlarged opening for a distance greater than a diameter of intermediate gears received in said intermediate gear pockets;
   intermediate gears received in said intermediate gear pockets, and secured at a position spaced radially inwardly of a radially outermost area in said intermediate gear pockets, with said intermediate gears having teeth engaged with teeth of a sun gear received in said central opening; and
   a ring gear received at radially outer locations such that ring gear teeth engage teeth of said intermediate gears.

2. The gear reduction as set forth in claim 1, wherein said intermediate gears and said sun gear are formed of single gear bodies, said ring gear is formed of two separate ring gear halves, said intermediate gears are secured by bushings; and journal bearings are inserted within each of said intermediate gears.

3. The gear reduction as set forth in claim 2, wherein a torque frame has a plurality of axially extending fingers received within slots in the carrier, at locations circumferentially intermediate of locations of said intermediate gears, and pins inwardly of radially inwardly extending apertures in a radially outer surface of said carrier, said pins locking said fingers within said slot, with said ring gear received radially outwardly of said radially inwardly extending apertures.

4. The gear reduction as set forth in claim 3, wherein said sun gear and said intermediate gears have two spaced portions, with each of said portions having helical gear teeth, with said helical gear teeth on said two portions extending in opposed directions, and said two ring gear halves each having one direction of helical gear teeth, with the helical gear teeth on said two halves ring gear extending in opposed directions.

5. The gear reductions as set forth in claim 3, wherein said torque frame grounds said carrier to a housing.

6. The gear reduction as set forth in claim 2, wherein said sun gear and said intermediate gears have two spaced portions, with each of said portions having helical gear teeth, with said helical gear teeth on said two portions extending in opposed directions, and said two ring gear halves each having one direction of helical gear teeth, with the helical gear teeth on said two halves ring gear extending in opposed directions.

7. The gear reduction as set forth in claim 2, wherein a gear ratio across the gear reduction is greater than about 2.5:1.

8. The gear reduction as set forth in claim 1, wherein a torque frame has a plurality of axially extending fingers received within slots in the carrier, at locations circumferentially intermediate of locations of said intermediate gears, and pins inwardly of radially inwardly extending apertures in a radially outer surface of said carrier, said pins locking said fingers within said slot, with said ring gear received radially outwardly of said radially inwardly extending apertures.

9. The gear reduction as set forth in claim 8, wherein said sun gear and said intermediate gears have two spaced portions, with each of said portions having helical gear teeth, with said helical gear teeth on said two portions extending in opposed directions, and said two ring gear halves each having one direction of helical gear teeth, with the helical gear teeth on said two halves ring gear extending in opposed directions.

10. The gear reductions as set forth in claim 8, wherein said torque frame grounds said carrier to a housing.

11. The gear reduction as set forth in claim 1, wherein said sun gear and said intermediate gears have two spaced portions, with each of said portions having helical gear teeth, with said helical gear teeth on said two portions extending in opposed directions, and said two ring gear halves each having one direction of helical gear teeth, with the helical gear teeth on said two ring gear halves extending in opposed directions.

12. The gear reduction as set forth in claim 1, wherein a gear ratio across the gear reduction is greater than about 2.5:1.

13. The gear reduction as set forth in claim 1, wherein each of said axially spaced apart side walls being formed with a plurality of bearing holes, with one of said plurality of bearing holes in each of said spaced apart side walls being associated with each of said intermediate gears, and there being journal bearings in each of said bearing holes in each of said spaced apart side walls supporting each of said intermediate gears.

14. A gas turbine engine comprising:
a fan drive turbine driving a fan rotor through a gear reduction including a unitary carrier centered on an axis and having a pair of axially spaced apart side walls, and axially extending circumferentially spaced connecting structure for connecting said pair of spaced side walls, a central opening, and circumferentially spaced smaller openings spaced radially outwardly of said central opening, with internal surfaces of said circumferentially spaced connecting structure to define intermediate gear pockets, with said intermediate gear pockets extending away from said central enlarged opening for a distance greater than a diameter of intermediate gears received in said intermediate gear pockets, intermediate gears received in said intermediate gear pockets, and secured at a position spaced radially inwardly of a radially outermost area in said intermediate gear pockets, with said intermediate gears having teeth engaged with teeth of a sun gear received in said central opening, and a ring gear received at radially outer locations such that ring gear teeth engage teeth of said intermediate gears.

15. The gas turbine engine as set forth in claim 14, wherein said intermediate gears and said sun gear are formed of single gear bodies, said ring gear is formed of two separate ring gear halves, said intermediate gears are secured by bushings; and
journal bearings are inserted within each of said intermediate gears.

16. The gas turbine engine as set forth in claim 15, wherein a torque frame has a plurality of axially extending fingers received within slots in the carrier, at locations circumferentially intermediate of locations of said intermediate gears, and pins inwardly of radially inwardly extending apertures in a radially outer surface of said carrier, said pins locking said fingers within said slot, with said ring gear received radially outwardly of said radially inwardly extending apertures.

17. The gas turbine engine as set forth in claim 16, wherein said sun gear and said intermediate gears have two spaced portions, with each of said portions having helical gear teeth, with said helical gear teeth on said two portions extending in opposed directions, and said two ring gear halves each having one direction of helical gear teeth, with the helical gear teeth on said two ring gear halves extending in opposed directions.

18. The gas turbine engine as set forth in claim 16, wherein said torque frame grounds said carrier to a housing.

19. The gas turbine engine as set forth in claim 15, wherein a gear ratio across the gear reduction is greater than about 2.5:1.

20. The gas turbine engine as set forth in claim 19, wherein said sun gear and said intermediate gears have two spaced portions, with each of said portions having helical gear teeth, with said helical gear teeth on said two portions extending in opposed directions, and said two ring gear halves each having one direction of helical gear teeth, with the helical gear teeth on said two ring gear halves extending in opposed directions.

21. The gas turbine engine as set forth in claim 20, wherein a torque frame has a plurality of axially extending fingers received within slots in the carrier, at locations circumferentially intermediate of locations of said intermediate gears, and pins inwardly of radially inwardly extending apertures in a radially outer surface of said carrier, said pins locking said fingers within said slot, with said ring gear received radially outwardly of said radially inwardly extending apertures.

22. The gas turbine engine as set forth in claim 15, wherein said sun gear and said intermediate gears have two spaced portions, with each of said portions having helical gear teeth, with said helical gear teeth on said two portions extending in opposed directions, and said two ring gear halves each having one direction of helical gear teeth, with the helical gear teeth on said two ring gear halves extending in opposed directions.

23. The gas turbine engine as set forth in claim 21, wherein said torque frame grounds said carrier to a housing.

24. The gas turbine engine as set forth in claim 14, wherein said sun gear and said intermediate gears have two spaced portions, with each of said portions having helical gear teeth, with said helical gear teeth on said two portions extending in opposed directions, and said ring gear formed of two ring gear halves, said two ring gear halves each having one direction of helical gear teeth, with the helical gear teeth on said two ring gear halves extending in opposed directions.

25. The gas turbine engine as set forth in claim 14, wherein a gear ratio across the gear reduction is greater than about 2.5:1.

26. The gas turbine engine as set forth in claim 14, wherein each of said axially spaced apart side walls being formed with a plurality of bearing holes, with one of said plurality of bearing holes in each of said spaced apart side walls being associated with each of said intermediate gears, and there being journal bearings in each of said bearing holes in each of said spaced apart side walls supporting each of said intermediate gears.

\* \* \* \* \*